United States Patent
Reitz et al.

[11] Patent Number: 5,810,502
[45] Date of Patent: Sep. 22, 1998

[54] SCREW FASTENER

[75] Inventors: Reinhold Reitz, Merzhausen; Günter Ochs, Stadtallendorf, both of Germany

[73] Assignee: Hoppe AG, Stadtallendorf, Germany

[21] Appl. No.: 716,365

[22] PCT Filed: Jan. 11, 1996

[86] PCT No.: PCT/EP96/00095
  § 371 Date: Nov. 22, 1996
  § 102(e) Date: Nov. 22, 1996

[87] PCT Pub. No.: WO96/22436
  PCT Pub. Date: Jul. 25, 1996

[30] Foreign Application Priority Data

Jan. 18, 1995 [DE] Germany .................. 295 00 691 U

[51] Int. Cl.⁶ .................. E05B 1/00; E05B 3/00; F16B 13/06
[52] U.S. Cl. .................. 403/257; 403/242; 403/230; 403/362
[58] Field of Search .................. 411/55, 60, 57; 403/257, 362, 256, 242, 230, 251, 261

[56] References Cited

U.S. PATENT DOCUMENTS

| | | | |
|---|---|---|---|
| 283,380 | 8/1883 | Cooper | 403/230 X |
| 313,722 | 3/1885 | Gordon | 403/262 X |
| 2,470,924 | 5/1949 | Flogaus | 411/57 |
| 4,714,391 | 12/1987 | Bergner | 411/55 X |
| 4,756,639 | 7/1988 | Hoshino | 403/362 X |
| 4,912,809 | 4/1990 | Scheuer. | |
| 5,246,322 | 9/1993 | Salice | 411/57 X |
| 5,458,448 | 10/1995 | Cheng | 411/60 X |

FOREIGN PATENT DOCUMENTS

| | | |
|---|---|---|
| 0 563 568 | 10/1993 | European Pat. Off. . |
| 2612577 | 9/1988 | France . |
| 2616832 | 12/1988 | France . |
| 2680551 | 2/1993 | France . |
| 10 39 880 | 9/1958 | Germany . |
| 92 05 735 | 2/1992 | Germany . |
| 4336796 | 12/1994 | Germany .................. 403/256 |
| 229386 | 10/1943 | Switzerland .................. 403/257 |
| 2203641 | 10/1988 | United Kingdom . |

*Primary Examiner*—Anthony Knight
*Attorney, Agent, or Firm*—Lowe Hauptman Gopstein Gilman & Berner

[57] ABSTRACT

For mounting the hollow ends (H) of a curved handle (G) in an orifice (B) on a contact face (A), a guide member (30) for a screw (29) has a base flange (31) which can be connected to expanding parts (39, 40, 60, 64) or a securing member (47) and on which there rests a tubular supporting member (12) which overlaps the hollow end (H). A cap nut (20) having a peripheral groove (24) for fixing the hollow end (H) through a setscrew V and wrench faces (33 and 23) like the head (32) can be screwed on to a head (32) of the guide member (30). A shank (37) of the guide member (30) with a conical end (39) or conical nut (64) directed against it can be pulled into an expanding nut (40) or an expanding tube (60) by means of the screw (29), enlarging an expanding basket (42, 62). A door handle (50) can be fixed, for example, on a multi-chamber profile (M), with the securing of a polygonal pin (47), the guide member (30) being secured externally by a flange ring (55).

29 Claims, 9 Drawing Sheets

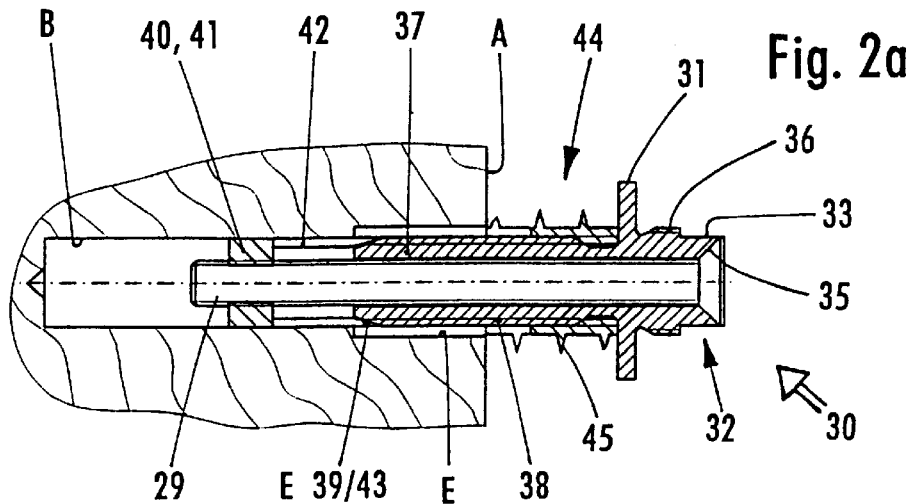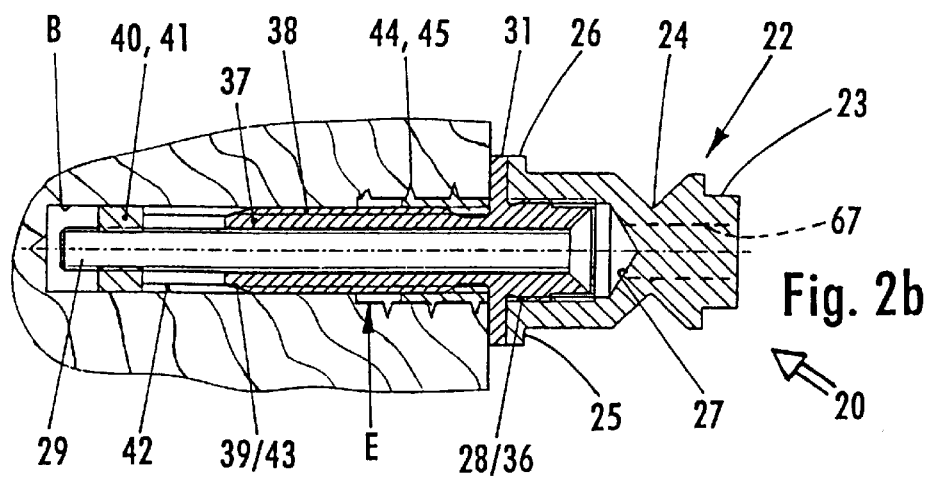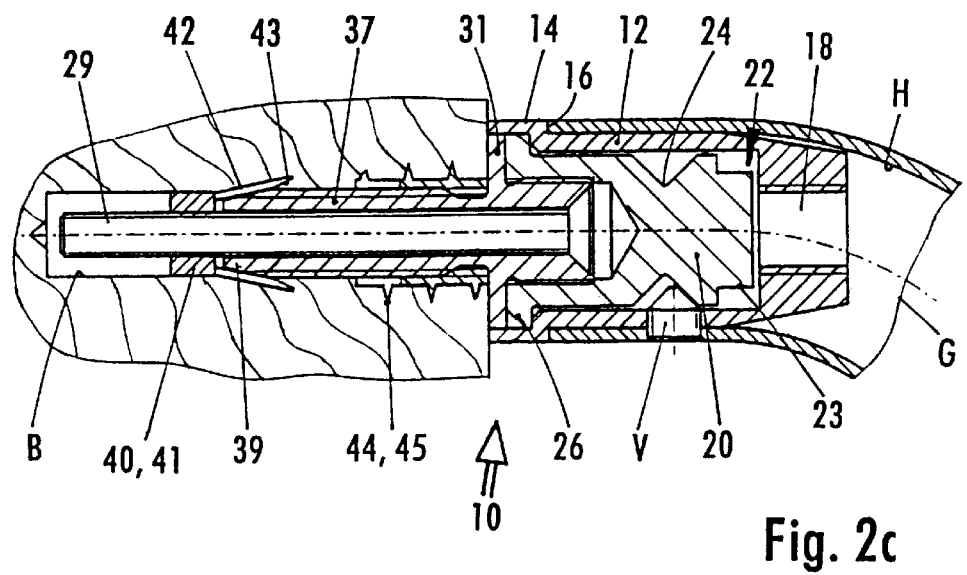

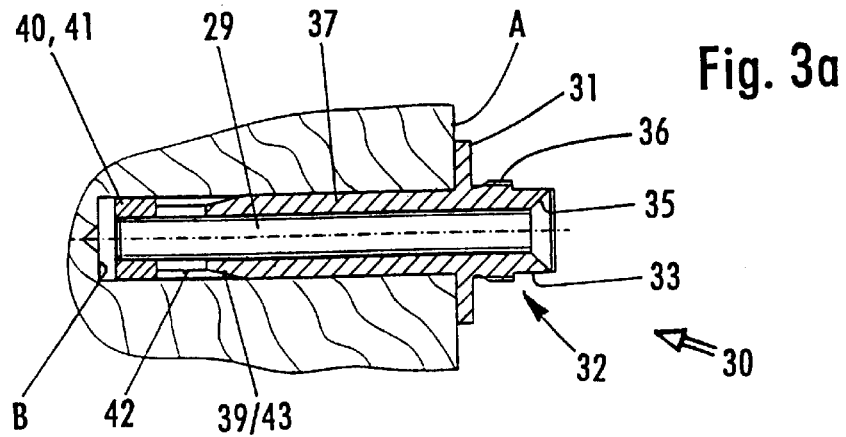
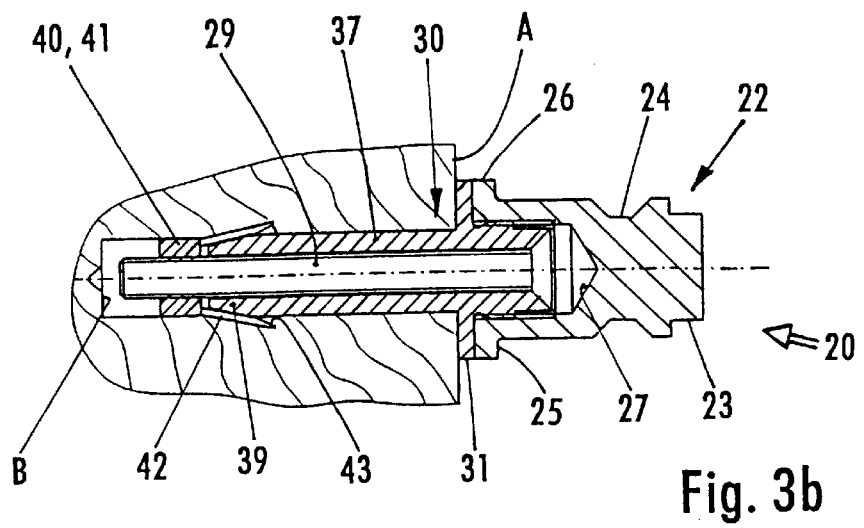
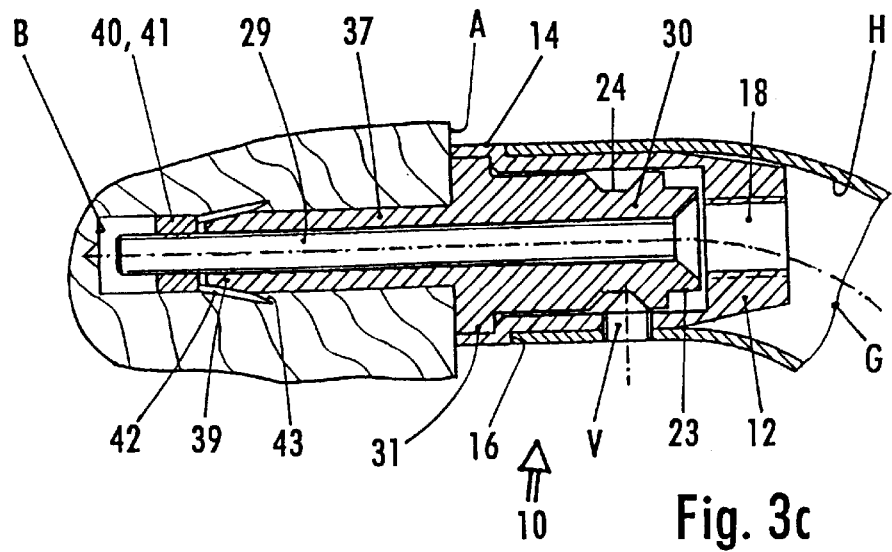

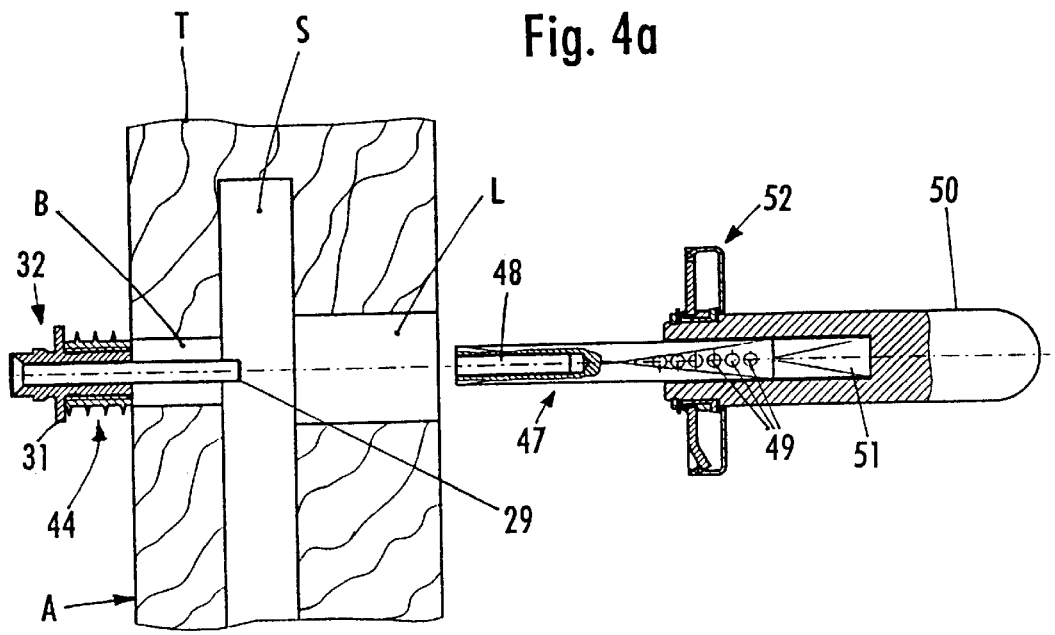
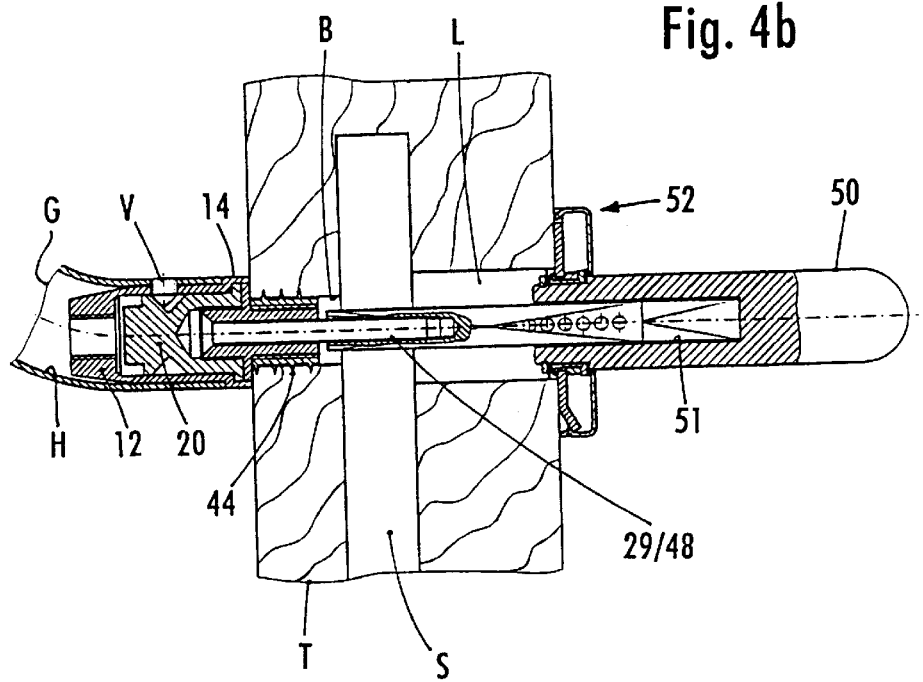

SCREW FASTENER

The present invention relates to a screw fastener.

Fastening means of this type are required for the mounting of curved handles provided with hollow ends on a contact face on a door, a window, a drawer or the like, fixing being achieved by means of expanding parts which are secured relative to one another in a hole by means of a screw. It is known to use curved handles in this way, for example on house doors; normal ironmongery is generally mounted on the interior of the door. If curved handles are fastened on one side from the exterior, coverings are generally required on the interior of the door, for example a blind round anchor plate or covering cap, to make the otherwise visible screw fastener as unnoticeable as possible. When arranged on a tubular frame, it is important neither significantly to influence its strength nor to create cold bridges.

An important aim of the invention is to simplify and accelerate the fastening of curved handles on wooden or tubular frame doors. Anchorage should take place quickly and reliably without covering elements being required on the interior of the door. It should also be possible to provide an axially rigid rotatable connection to a door handle without problems.

The main features of the invention are given in the claim.

According to one feature of the invention, a screw fastener of the type mentioned at the outset has a guide member for the screw comprising, for resting on the contact face, a base flange which is provided with or is connectable to the expanding parts or securing member and on which the associated hollow end is supported via a supporting member rigidly or detachably connected thereto.

A mounting set of this type consists of few components which are inexpensive to produce and can be arranged exactly in a short space of time. It is important for the guide member to take over the support on the contact face by the base flange so the curved handle does not come directly on to the contact face or allow pressing or pulling which is otherwise possible. Rather, anchorage is effected via the base flange on the contact face behind or beneath which the expanding parts are secured by the screw which passes through the guide member. The supporting member is preferably held detachably thereon and, in turn, is preferably welded to the curved handle end in order to absorb the forces and moments occurring during use of the handle as well as possible.

According to another feature of the invention, a collar of the supporting member positively overlaps the base flange of the guide member, fixing being particularly secure. According to an aspect of the invention, the supporting member can be a tube having a collar with a peripheral shoulder and an orifice which is axially opposed thereto and through which the fastening screw can be adjusted if necessary.

According to still another feature of the invention, a head is integrally connected to the base flange on the supporting body side, the head being provided with an external thread for holding a cap nut which can be overlapped positively and/or non-positively by the supporting member according to still another aspect of the invention. However, the invention also proposes that the head and cap nut be designed integrally so as to simplify production and storage.

In the design according to yet another feature of the invention, the guide member has an orifice which axially guides the screw and of which the end can be screwed into an expanding part. The screw head is preferably received in a recess provided on the head and/or on the cap nut on the supporting body side according to yet another aspect of the invention.

It is advantageous if, according to another feature of the invention, the head and/or the cap nut has, at an axial distance from the base flange, a peripheral notch, in particular a V-shaped groove in which a setscrew penetrating the hollow end and the supporting member, in particular radially, engages to fix the hollow end. This allows rapid release of the connection, if necessary, for example to exchange or adjust a curved handle.

It has proven advantageous for mounting if the head and/or the cap nut has tool application wrench faces according to still another feature of the invention, in particular parallel flattened regions of a predetermined wrench width. It is therefore possible to hold with the tool while the screw is tightened by a screwdriver to secure the expanding parts.

Securing is carried out very simply according to another aspect of the invention in that the guide member has a shank issuing from the base flange with a conical end which can be pulled by the screw into an expanding part which is thus widened. According to still another aspect of the invention, the shank can have an external thread on to which a threaded wooden tube can be screwed which, in turn, has an external broad thread, this being very advantageous for mounting the curved handle on a softwood surface.

According to yet another feature of the invention, an expanding part can be used as expanding part which has a cylindrical base with an internal thread and an expanding basket which is open towards the base flange and is preferably provided with wedge faces. The conical end of the shank acts on the wedge faces when the screw is being turned in and therefore presses the individual tongues of the expanding basket into the orifice.

Alternatively, the expanding part can be a tube having an expanding basket which is open remotely from the base flange, is preferably provided with wedge faces and can be widened by a conical nut directed away from it. The screw engages therein so the tubular basket expands and its tongues can engage behind an internal contact face. This method of mounting is suitable, in particular, for tubular frames or other hollow bodies having a reinforcement or intermediate internal surface.

According to yet another aspect of the invention, the base flange can have a recess, in particular for the positive holding and supporting of a top bush of the expanding tube, allowing particularly reliable fixing.

According to another feature of the invention, a further development of the invention is characterized in that a polygonal pin which is provided with an axial threaded aperture, can be fixed axially by the screw and on which a door handle can be mounted can be introduced as a securing member into an aperture aligned with the orifice. This can be arranged without difficulty on the interior of the door, the connection to the components coming from the exterior being guaranteed in a simple manner by the straining screw.

A supporting ring which is provided with a flange and secures the guide member in its position can advantageously be screwed on to the guide member according to still another feature of the invention, the cap nut acting as a counter part. This is particularly useful in the design according to another aspect of the invention, in which the guide member can be introduced through an aperture in a multi-chamber profile until it contacts the base flange at an internal frame provided with the orifice and can be fixed by screwing the supporting ring until it contacts the multi-chamber profile, in particular on an external tubular frame next to the aperture. This method of fastening prevents cold bridges in the interior of the multi-chamber profile on which the guide member can be rigidly arranged. If an internal door handle is to be provided, an axially screwable polygonal pin can be introduced into a further aperture provided opposite the inlet aperture in the multi-chamber profile according to still another aspect of the invention, the polygonal pin being connected to the door handle in a known manner, for example by a transverse pin which is driven through the handle neck into one of several adjusting apertures of the polygonal pin. The positive connection between the polygonal pin and the door handle is preferably produced according to yet another feature of the invention with a contact plate which is bordered by the door handle resting on the tubular frame preferably due to axially rigid rotatable fixing. Since the polygonal pin secured by the screw passes through the part of a lock inserted into a lock recess of the door according to another feature of the invention, the latch is also entrained here in the normal manner by actuation of the door handle.

Further features, details and advantages will emerge from the wording of the claims and from the following description of embodiments given with reference to the drawings.

FIGS. 2a, 2b and 2c are axial sections through various stages of installation of the components shown in FIG. 1 to the complete screw fastener.

FIGS. 3a, 3b and 3c are axial sections through the installation of components of a mounting set of a simplified embodiment to the complete screw fastener.

FIGS. 4a and 4b are axial sections through components of a mounting set according to FIG. 4 at the beginning and at the end of mounting.

Figure 1:
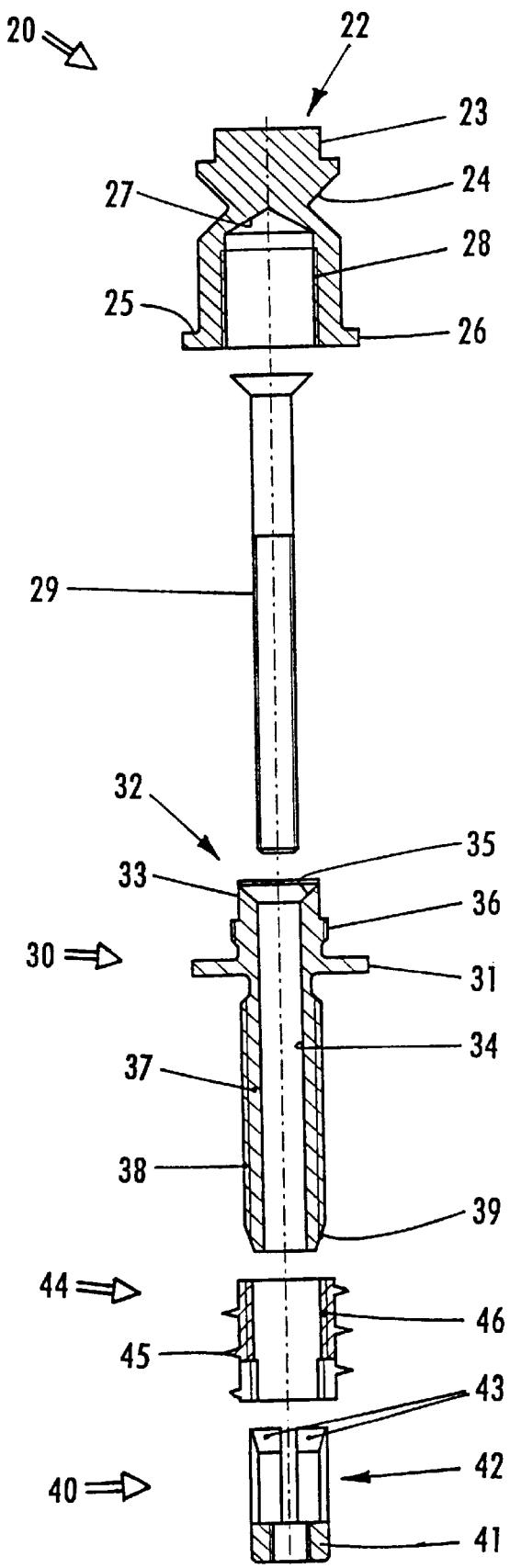
FIG. 1 is an exploded view of major components of a mounting set for the screw fastener.

FIG. 1 shows a cap nut 20 with a head 22 having two parallel wrench faces 23 and a peripheral recess in the form of a V-shaped groove 24. A shoulder 25 is provided on a supporting flange 26 axially remote from the head 22. A blind aperture 27 directed from the flange 26 to the head 22 has an internal thread 28.

A further component of the mounting set shown in FIG. 1 is a flat head screw 29 which can be introduced into a guide member 30 with an aperture 34 and can rest with its head on a recess 35 in the guide member 30. The guide member has a head 32 with two parallel wrench faces 33 and an external thread 36. A base flange 31 is connected to the external thread 36 and continues with a shank 37 bearing an external thread 38 and having a conical end 39. A threaded wooden tube 44 with an internal thread 46 can be screwed on to the external thread 38 of the shank 37.

A further component of the mounting set in FIG. 1 is an expanding nut 40 having a cylindrical base 41 with internal thread and a gripping cone or expanding basket 42. The expanding basket 42 has tongues which are separated by axial slots and of which the free ends have wedge faces 43.

Individual mounting stages are shown in FIGS. 2a to 2c. An orifice B with a step-shaped enlargement E is introduced into a contact member, for example a door, initially perpendicularly to the contact face A. A pre-assembled unit consisting of guide member 30 with a screw-on threaded wooden tube 44, inserted screw 29 and expanding nut 40 is inserted into the stepped orifice B, E according to FIG. 2a. As soon as the threaded wooden tube 44 has been turned completely into the staged orifice B, E due to the action of a tool (not shown) on the wrench faces 33 (FIG. 2b), the cap nut 22 can be screwed by its internal thread 28 on to the external thread 36 of the head 32. However, the screw 29 should previously have been tightened sufficiently for the expanding basket 42 with the wedge faces 43 to slide on to the conical end 39 of the shank 37 and thus press the tongues of the expanding basket into the wall of the orifice B. It is also possible and proposed according to the invention to provide the cap nut 22 with a cut 67 indicated in broken lines in FIG. 2b to enable a rotating tool to be applied to the head of the screw 29.

It is shown in FIG. 2c that the unit secured in the orifice B together with cap nut 20 is overlapped by a supporting member 12 having a collar 14 and an external shoulder 16 and—facing the cap nut head 22—an aperture 18. The hollow end H of a curved handle G rests on the shoulder 16 of the supporting member 12 of which the collar overlaps the flanges 26, 31 of cap nut 20 and guide member 30. A transverse setscrew V fixes the hollow end H together with supporting member 12 on the V-shaped groove 24 of the cap nut 20. As the cap nut 20 rests with its flange 26 on the base flange 31 of the guide member 30, the curved handle G is reliably fixed with its hollow end H on the installed mounting set designated in its entirety by 10.

A comparable but simplified embodiment is shown in FIGS. 3a to 3c. The mounting set used here has similar components to the embodiment in FIGS. 2a to 2c but the threaded wooden tube 44 is dispensed with for fastening on harder material proposed here. A smooth orifice B without a stepped enlargement (E) consequently also suffices. After introduction of the guide member 30 together with screw 29 and expanding nut 40 into the orifice B (FIG. 3a), the screw 29 is tightened and the expanding basket 42 therefore enlarged; the cap nut 20 can then be screwed on (FIG. 3b). However, it is also possible and proposed according to the invention to design the head 32 of the guide member 30 integrally with the cap nut 20, as shown as a variation in the diagram of final mounting (FIG. 3c). In this case also, the supporting member 12 with its collar 14 overlaps the base flange 31, the hollow end H of a curved handle G resting on the shoulder 16 and being fixed by means of the transverse setscrew V. It can also be seen that the V-shaped groove 24 can have a flatter groove base, providing a larger cross section for the cap nut 22 or the guide member 30 and minimizing the risk of breakage. The tip of the setscrew V can be correspondingly rounded or flattened.

Figure 4:
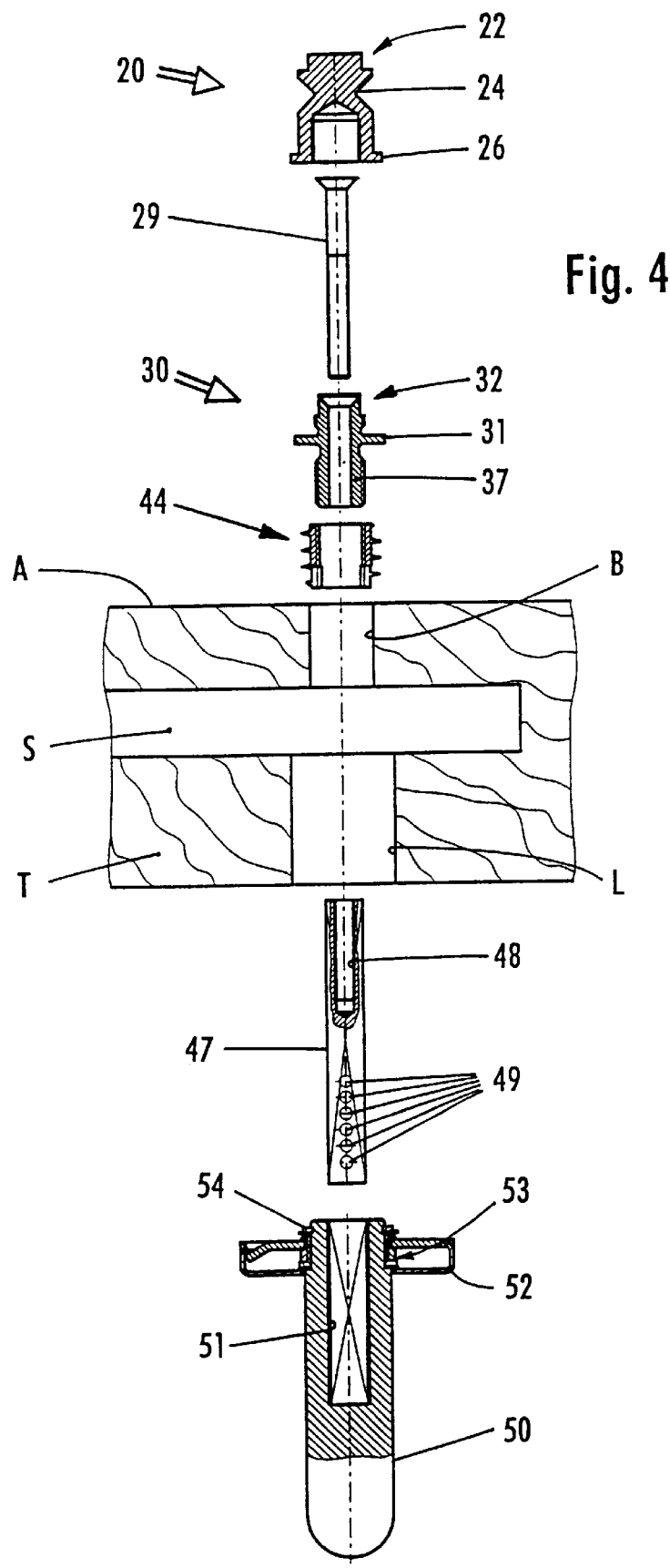
FIG. 4 is an exploded view of components of a screw fastener for fixing on a door with an internal handle.

FIG. 4 shows a further embodiment of a mounting set, the supporting member 12 for the curved handle again being omitted in this figure. It can be seen that the threaded hollow tube 44 can be screwed on to the shank 37 of the guide member 31, whereupon the screw 29 can be introduced into the head 32 and the assembly thus formed can be screwed into the orifice B (FIG. 4a). A square pin 47 having an axial threaded aperture to be screwed to the screw 29 can be introduced from the opposite side of the door panel T through an aperture L. It also has adjusting apertures 49 which, after insertion of the free end of the square pin into a square aperture 51 of a door handle 50, allow the door handle 50 to be fixed to the necessary axial depth by a transverse pin (not shown) (FIG. 4b). After application of the cap nut 20, the supporting member 12 is fixed externally on the door T with the transverse setscrew V together with the hollow end H of the door handle G. As can be seen, the square pin 47 penetrates not only the aperture L but also a lock recess S which usually receives a lock (not shown here), the part of which is positively penetrated by the square pin 47. A unit comprising stop plate and shield 52, which is fixed on the door handle 50 by a border 54 together with guide members 53 is screwed on the interior of the door in the conventional manner while being covered by the shield 52.

Figure 5:
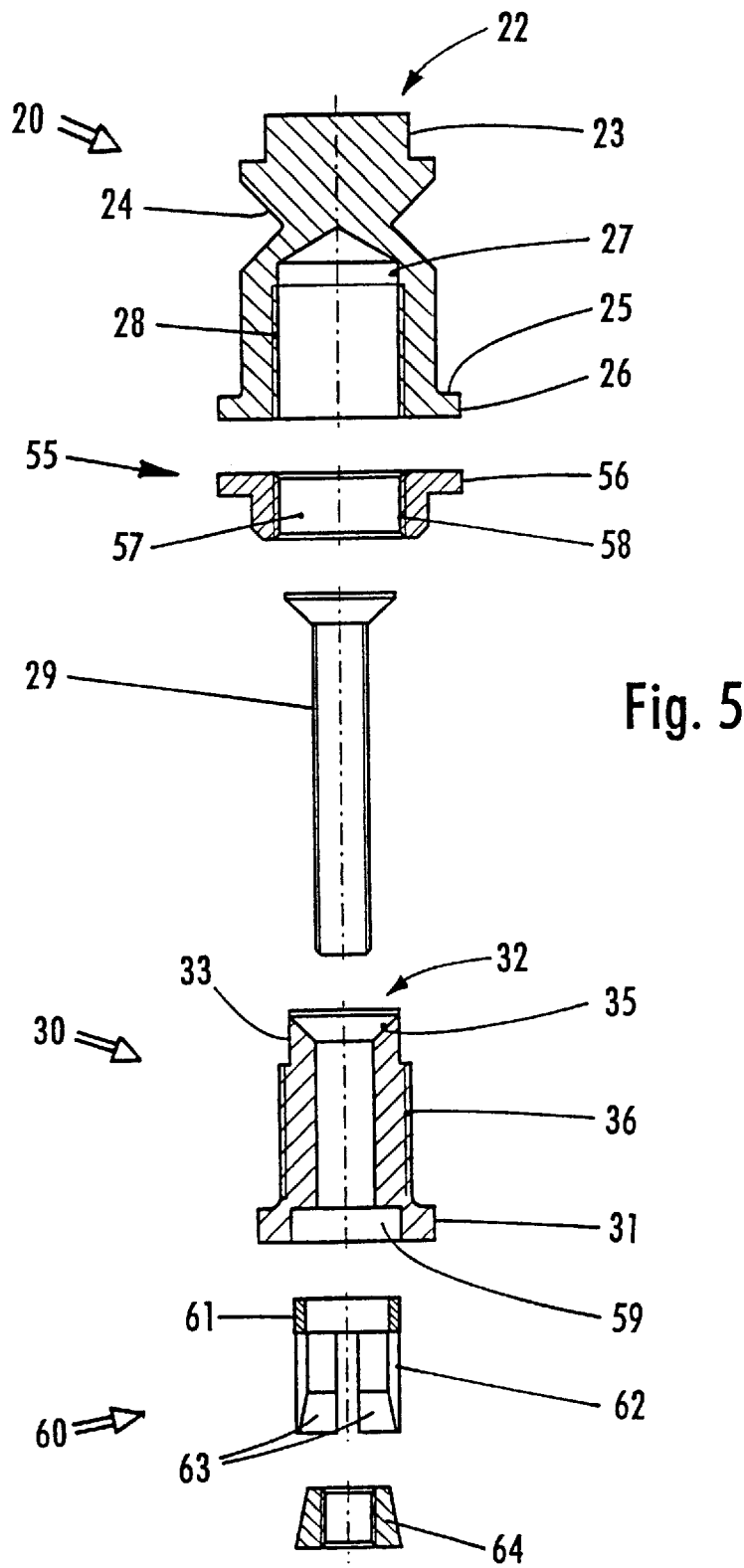
FIG. 5 is an exploded view of main components of a further embodiment of a mounting set.

Whereas the above-described embodiments illustrated a screw fastener on solid material, in particular on wooden doors, the embodiment according to FIG. 5 is used for fastening on a multi-chamber profile M consisting of an external tubular frame R and an internal frame I. The latter can be provided with a reinforcement P (FIGS. 5a, 5b) as normal with plastic profiles. The mounting set provided here for the screw fastening additionally comprises a supporting ring 55 with a flange 56 and an orifice 57 of such a width that the head of the screw 29 passes through and an internal thread 58 can be screwed to the external thread 36 of the guide member 30. The flange 56 has the same external diameter as the supporting flange 26 of the cap nut 20 which can also be arranged with its internal thread 28 on the external thread 36 of the head 32 and assumes the function of a counter part in the final position.

The guide member 30 has, in its base flange 31, a recess 59 serving to hold a top bush 61 of an expanding tube 60. This expanding tube 60 is provided with an expanding basket 62, directed away from the base flange 31, with wedge faces 63 which slide on an opposingly directed conical nut 64 when screwed to the screw 29.

Figure 5B:
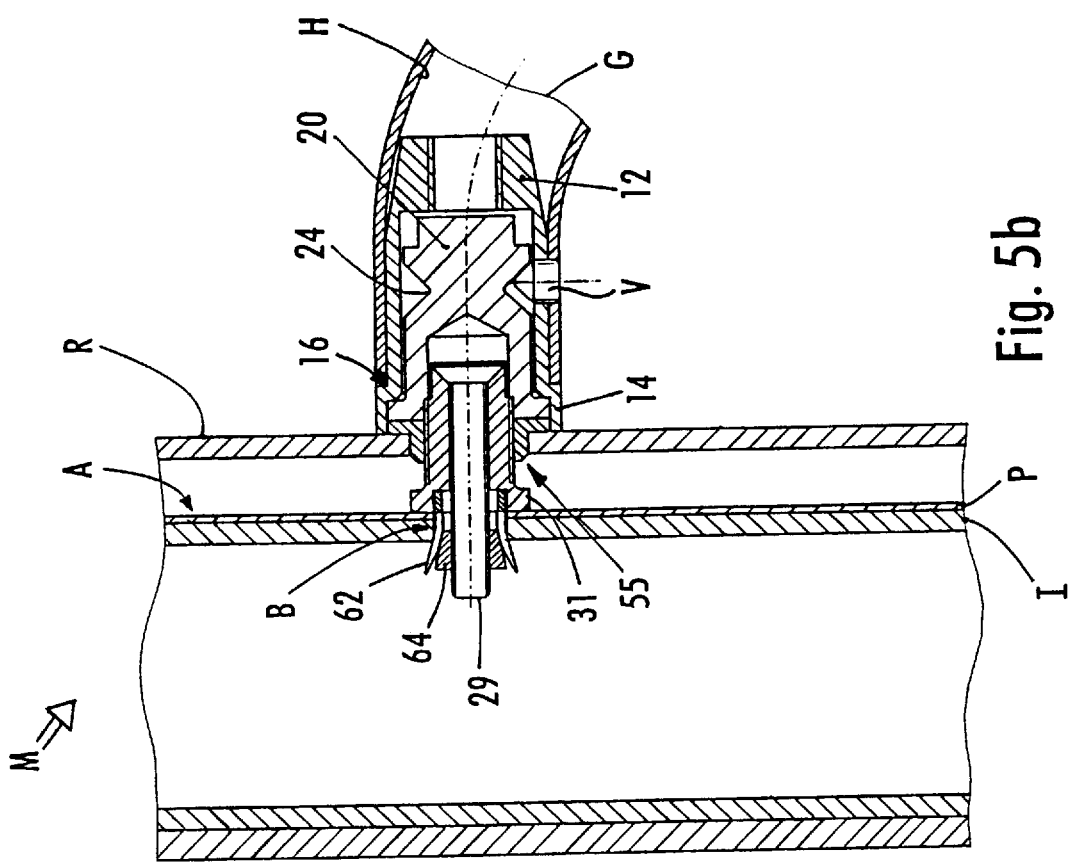
FIGS. 5a and 5b are sectional views of components of the mounting set according to FIG. 5 during and after installation in a multi-chamber profile.
Figure 5A:
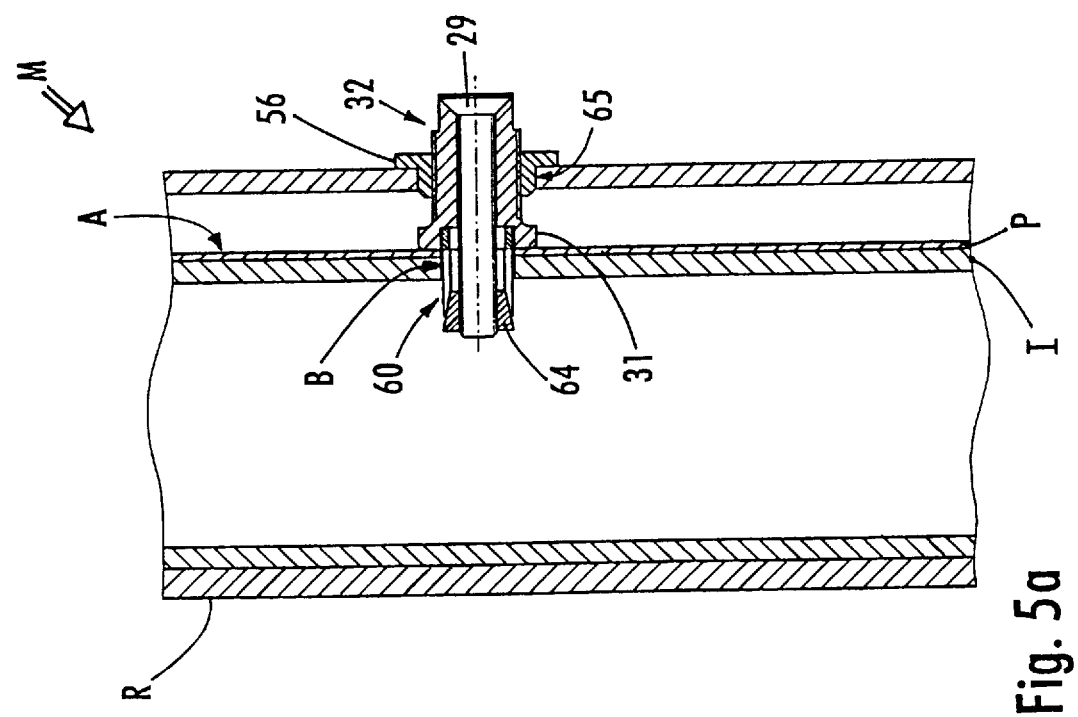

FIG. 5a shows that a previously assembled unit of guide member 30, screw 29, expanding tube 60 and conical nut 64 is introduced through an orifice 65 on the outer tubular frame R in such a way that the base flange 31 rests on the reinforcement P on the internal frame I. The supporting ring 55 is then screwed on to the head 32 until the flange 56 rests flush on the tubular frame R (FIG. 5a). The screw 29 can now be tightened so that the conical nut 64 widens the expanding basket 62 and therefore fixes the unit on the internal frame I. The cap nut 20 is then screwed to the head 32, securing the fastener in the manner of a counter part. The supporting member 12 which is then slipped on overlaps the two flanges 31, 26 with its collar 14 and is in turn overlapped by the hollow end H of the curved handle G until it strikes the shoulder 16. The transverse setscrew V holds the end H of the curved handle (figure 5b).

Figure 6:
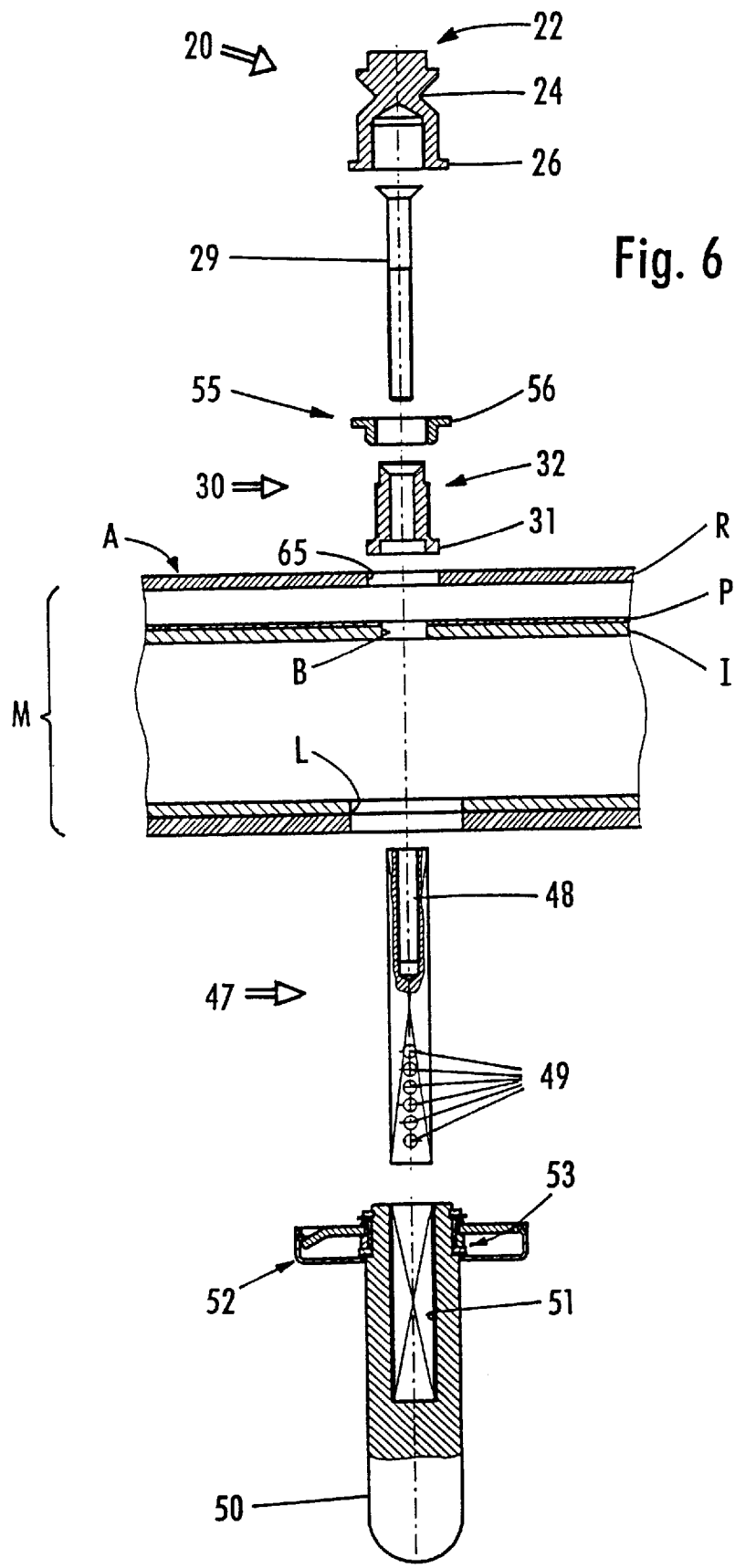
FIG. 6 is an exploded sectional view of a further embodiment of a mounting set and of a multi-chamber profile and a door handle connection.
Figure 6A:
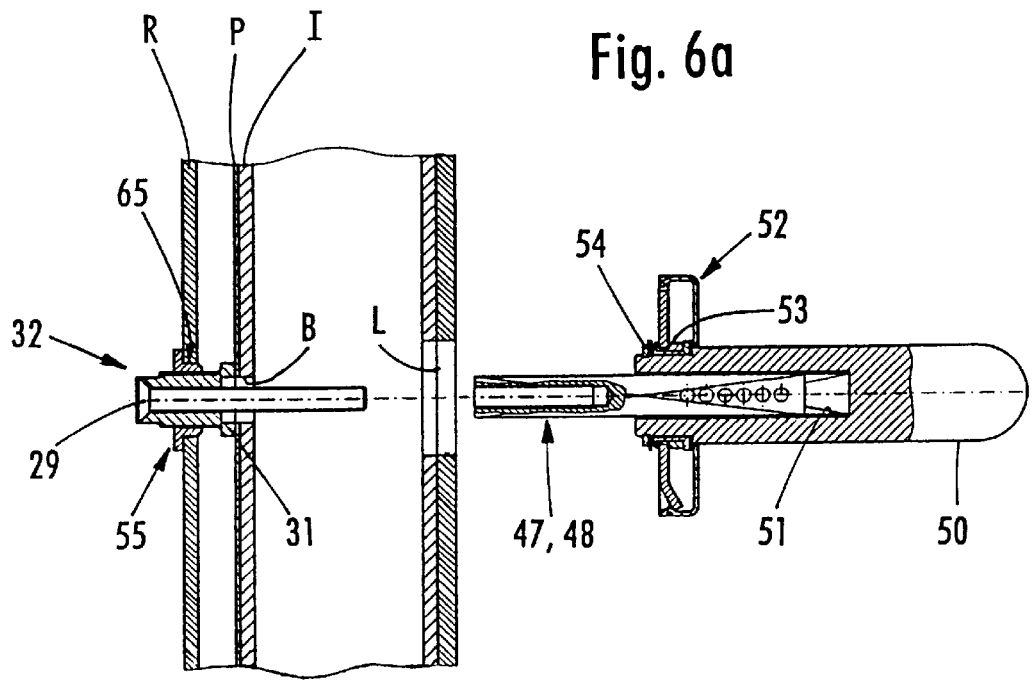
FIGS. 6a and 6b are sectional views of components of a mounting set according to FIG. 6 during and after mounting.
Figure 6B:
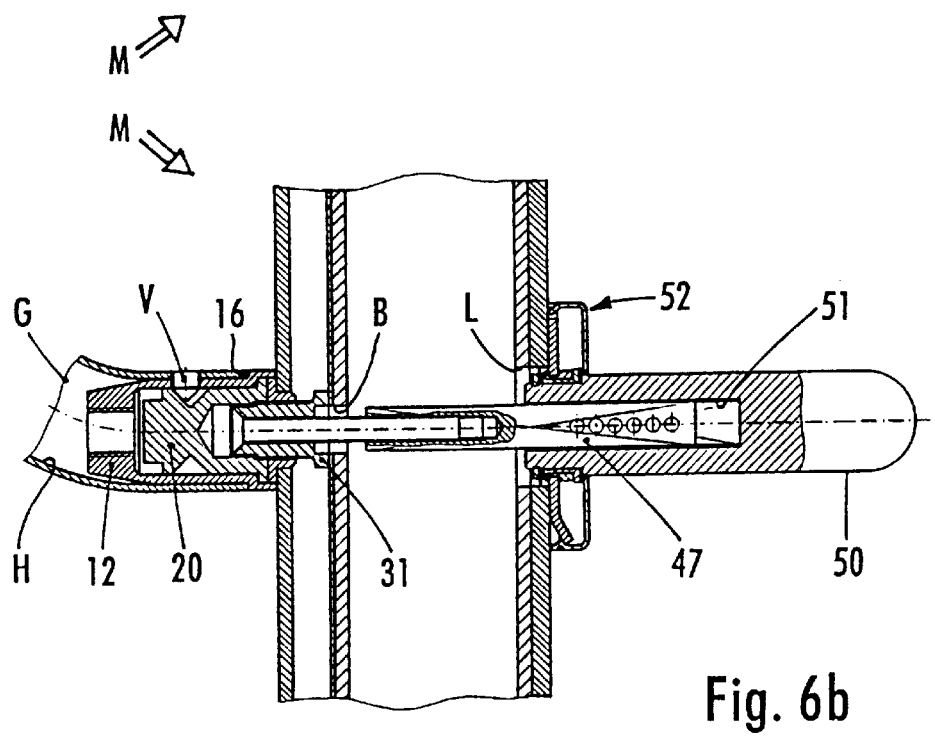

A further embodiment according to FIG. 6 resembles that in FIG. 4 1 but a multi-chamber profile M is again provided instead of a solid wood frame. The components 20, 29, 55, 30 are fastened externally in the above-described manner in that the guide member 30 is introduced through the orifice 65 until the base flange 31 rests on the contact face A of the reinforcement P. The supporting ring 55 fixes the guide member 30, whereupon the screw 29 is inserted and screwed to the square pin 47 on the threaded aperture 48 (FIG. 6a). With an appropriate depth of screwing, the door handle 50 is fixed with its square aperture 51 on the adjusting apertures of the square pin 47 by a transverse pin (not shown) so the unit comprising contact plate and shield 55 can be screwed so as to rest snugly on the outer tubular frame R next to the aperture L. Once the cap nut 20 has been screwed externally on to the head 32 and the supporting member 12 has been slipped on, the supporting member 12 is in turn fixed thereon together with the hollow end H of the curved handle G with the transverse setscrew V (FIG. 6b).

The invention is not restricted to the illustrated designs and embodiments. It is important that the one-sided curved handle fastener is provided, in particular, on doors T or multi-chamber profiles M without covering elements, the holding of the supporting member 12 being effected by the head 32 of the guide member 30—preferably with interposition of the cap nut 20. The hollow end H of the curved handle G rests directly or indirectly on the base flange 31 but not on the contact face A itself so no action takes place on the surface of door or frame during use of the handle. For fastening, in particular, on soft wood, the threaded tube 44 offers additional security of connection. With multi-chamber profiles M, an internal frame I or a reinforcement P acts as carrier for the screw fastener which is therefore also secured deep in the interior, more specifically without cold bridges. Partial pre-assembly is possible in all cases, and the external visible wrench faces cannot be altered or damaged when appropriately mounted. The screw fastening system according to the invention is also suitable for connection to an internal door handle, in which case no covering elements are required apart from the shield (for its conventional contact plate).

Essential advantages of the invention reside in the fact that, for mounting the hollow ends H of a curved handle G in an orifice B on a contact face A, a guide member 30 for a screw 29 has a base flange 31 which can be connected to expanding parts 39, 40, 60, 64 or a securing member 47 and on which there is supported a tubular supporting member 12 which can advantageously be welded into the hollow end H. A cap nut 20 can be screwed on to a head 32 of the guide member 30, the cap nut 20 comprising a peripheral groove 24 for fixing the hollow end H through a setscrew V and, like the head 32, wrench faces 33 or 23. A shank 37 of the guide member 30 with cone end 39 or a conical nut 64 directed against it can be pulled into an expanding nut 40 or an expanding tube 60 by the screw 29, so an expanding basket 42, 62 is enlarged. A door handle 50 can be fixed, for example, on a multi-chamber profile M by the securing of a polygonal pin 47, the guide member 30 being secured externally by a flange ring 55.

All features and advantages emerging from the claims, the description and the drawings, including constructional details and spatial arrangements can be essential to the invention both individually and in various combinations.

We claim:

1. Screw fastener for the mounting of curved handles (G) provided with hollow ends (H) on a contact face (A) of a structure, with expanding parts (39, 40, 60, 64) which can be secured relative to one another by a screw (29) in an orifice (B) characterized by a guide member (30) for the screw (29) comprising a base flange (31) for resting on the contact face (A), which base flange is provided with or connectable to the expanding parts (39, 40, 60, 64) or to a securing member (47) and on which the associated hollow end (H) is supported via a supporting member (12) connected rigidly or detachably thereto, characterized in that a head (32) is integrally connected to the base flange (31) on the supporting body side and comprises an external thread (36) for holding a cap nut (20).

2. Screw fastener for mounting a curved handle (G) with hollow ends (H) on a contact face (A), said fastener having expanding parts (39, 40, 60, 64) which are securable relative to one another by a screw (29) in an orifice (B), said fastener comprising:

a guide member (30) for the screw (29),
said guide member including a base flange (31) for resting on the contact face (A), said base flange connectable to said expanding parts (39, 40, 60, 64) or to a securing member (47), said base flange connected to a supporting member (12) on which an associated hollow end (H) is supported, and a head (32) integrally connected to said base flange (31) on the side of the supporting member, said head having an external thread (36) for holding a cap nut (20).

3. Fastener according to claim 1, wherein said supporting member (12) is welded to the hollow end (H) and overlaps said cap nut (20).

4. Fastener according to claim 1, wherein said supporting member (12) comprises a collar (14) overlapping said base flange (31) of said guide member (30) and further comprises an external shoulder (16) supporting the hollow end (H) of handle (G).

5. Fastener according to claim 1, wherein said supporting member (12) comprises a tube having a collar (14) dimensioned to positively overlap said base flange (31) of guide member (30), said collar (14) having a peripheral shoulder (16) and an aperture (18) axially opposed thereto.

6. Fastener according to claim 1, wherein said guide member (30) comprises an aperture (34) axially guiding said screw (29), said screw (29) having an end which is screwable into an expanding part (40; 60/64).

7. Fastener according to claim 1, wherein said head (32) and/or said cap nut (20) is provided with a recess (35) on the side of the supporting member.

8. Fastener according to claim 1, wherein said head (32) and/or said cap nut (20) comprises, at an axial distance from said base flange (31), a peripheral V-shaped groove (24) in which a set screw (V) radially penetrates both the hollow end (H) and engages said supporting member (12) for fixing the hollow end (H).

9. Fastener according to claim 1, wherein said head (32) and/or said cap nut (20) comprises tool application faces.

10. Screw fastener according to claim 9 wherein said tool application faces comprise parallel flats (33 or 23) of given wrench width.

11. Fastener according to claim 1, wherein an expanding nut (40) comprises a cylindrical foot (41) with an internal thread and an expanding basket (42) provided with wedge faces (43) which basket (42) is open towards said base flange (31).

12. Fastener according to claim 1, wherein an expanding tube (60) comprises an expanding basket (62) provided with wedge faces (63) which is open remotely from said base flange (31) and is adapted to be widened by a conical nut (64) directed thereagainst.

13. Fastener according to claim 12, wherein said base flange (31) has a recess (59) for positively holding and supporting a top bush (61) of said expanding tube (60).

14. Screw fastener for mounting a curved handle (G) with hollow ends (H) on a contact face (A), said fastener having expanding parts (39, 40, 60, 64) which are securable relative to one another by a screw (29) in an orifice (B), said fastener comprising:

a guide member (30) for the screw (29), said guide member including a base flange (31) for resting on the contact face (A), said base flange connectable to said expanding parts (39, 40, 60, 64) or to a securing member (47), said base flange connected to a supporting member (12) on which an associated hollow end (H) is supported, wherein said guide member (30) comprises a shank (37) issuing from said base flange (31) with a conical end (39) adapted to be pulled into an expanding part (40, 60) by said screw (29), and wherein a tube (44), threaded for woodwork and having an external broad thread (45), is screwable onto an external thread (38) of said shank (37).

15. Screw fastener for mounting a curved handle (G) with hollow ends (H) on a contact face (A), said fastener having expanding parts (39, 40, 60, 64) which are securable relative to one another by a screw (29) in an orifice (B), said fastener comprising:

a guide member (30) for the screw (29), said guide member including a base flange (31) for resting on the contact face (A), said base flange connectable to said expanding parts (39, 40, 60, 64) or to a securing member (47), said base flange connected to a supporting member (12) on which an associated hollow end (H) is supported, and wherein a polygonal pin (47) is provided with an axial threaded aperture (48) for fixation by means of said screw (29) and is connectable to a door handle (50) and introducible as a securing member into a further aperture (L) aligned with the orifice (B).

16. Fastener according to claim 15, wherein said guide member (30) is insertable through an aperture (65) in a multi-chamber profile (M) until said base flange (31) rests on an internal frame (I) provided with the orifice (B) and is fixable by screwing on said supporting ring (55) until it contacts on the multi-chamber profile (M).

17. Fastener according to claim 16, wherein the multi-chamber profile (M) includes an external tubular frame (R) next to said inlet aperture (65).

18. Fastener according to claim 17, further comprising a polygonal pin (47) with an axial threaded aperture (48) for fixation by means of said screw (29), said pin being connectable to a door handle (50) and introducible as a securing member into a further aperture (L) provided opposite said inlet aperture (65) in the multi-chamber profile (M).

19. Fastener according to claim 18, wherein by positive connection of said polygonal pin (47) to the door handle (50), the latter is attachable to the tubular frame (R) in an axially firm but rotatable manner with application of a contact plate (66) bordered thereby.

20. Fastener according to claim 18, wherein said polygonal pin (47) secured by said screws (29) penetrates part of a lock inserted in a lock recess (S) of the door (T).

21. Screw fastener for mounting a curved handle (G) with hollow ends (H) on a contact face (A), said fastener having expanding parts (39, 40, 60, 64) which are securable relative to one another by a screw (29) in an orifice (B), said fastener comprising:

a guide member (30) for the screw (29), said guide member including a base flange (31) for resting on the contact face (A), said base flange connectable to said expanding parts (39, 40, 60, 64) or to a securing member (47), said base flange connected to a supporting member (12) on which an associated hollow end (H) is supported, and wherein a supporting ring (55) provided with a flange (56) is screwable onto said guide member (30).

22. Fastener according to claim 21, wherein said guide member (30) is insertable through an aperture (65) in a multi-chamber profile (M) until said base flange (31) rests on an internal frame (I) provided with the orifice (B) and is fixable by screwing on said supporting ring (55) until it contacts on the multi-chamber profile (M).

23. Fastener according to claim 22, wherein the multi-chamber profile (M) includes an external tubular frame (R) next to said inlet aperture (65).

24. Fastener according to claim 23, further comprising a polygonal pin (47) with an axial threaded aperture (48) for fixation by means of said screw (29), said pin being connectable to a door handle (50) and introducible as a securing member into a further aperture (L) provided opposite said inlet aperture (65) in the multi-chamber profile (M).

25. Fastener according to claim 24, wherein by positive connection of said polygonal pin (47) to the door handle (50), the latter is attachable to the tubular frame (R) in an axially firm but rotatable manner with application of a contact plate (66) bordered thereby.

26. Fastener according to claim 24, wherein said polygonal pin (47) secured by said screws (29) penetrates part of a lock inserted in a lock recess (S) of the door (T).

27. Screw fastener for mounting hollow ends (H) of a curved handle (G) onto a contact face (A), comprising:

a guide member for a screw (29) and insertable into an orifice (B);

said guide member (30) having a base flange (31) which is connectable to expanding parts (39, 40, 60, 64) or to a securing member (47);

a tubular supporting member (12) resting on said base flange (31);

said tubular supporting member (12) configured to be overlapped by a hollow end (H) of the handle (G);

said guide member (30) further having a head (32); and a cap nut (20) screwable onto said head (32) of said guide member (30);

said cap nut (20) including a peripheral groove (24) for a set screw (V) to fix the respective overlapping hollow end (H).

28. Screw fastener according to claim 27, wherein said guide member (30) is provided with a conical end (30) or a conical nut (64) directed against it, and wherein an expanding nut (40) or an expanding tube (60) is adapted to be tightened by said screw (29) thereby to enlarge and clamp an expanding basket (42, 62) in the orifice (B).

29. Screw fastener according to claim 27, wherein said screw (29) is insertable into the orifice (B) through said base flange (31) of said guide member (30), said base flange (31) separating a head portion of said screw (29) external to the orifice (B) from an elongated portion thereof engaging said expanding parts (39, 40, 60, 64) within the orifice (B), said screw (29) expanding said expanding parts (39, 40, 60, 64) within the orifice by insertion thereinto through said base flange (31).

* * * * *